Feb. 6, 1962 L. C. PATTERSON 3,020,081
HYDRAULIC KICK BUMPER SUB
Filed April 28, 1958 3 Sheets-Sheet 3
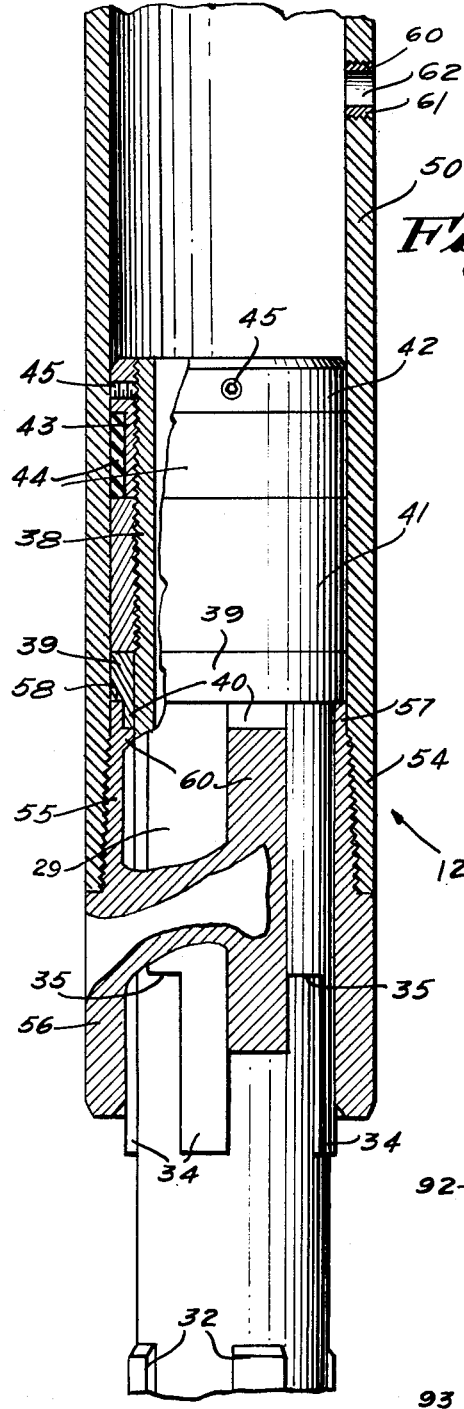
Fig. 3A.
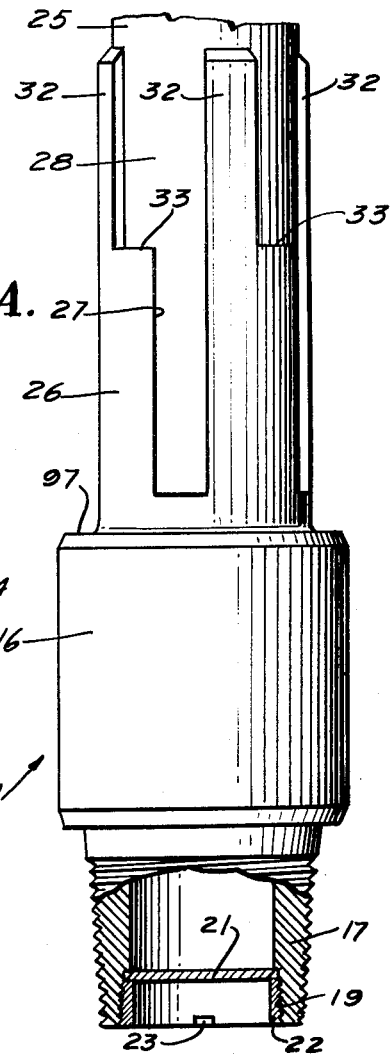
Fig. 3B.
Fig. 4.
LESTER C. PATTERSON,
INVENTOR.
WHANN & McMANIGAL
Attorneys for Applicant

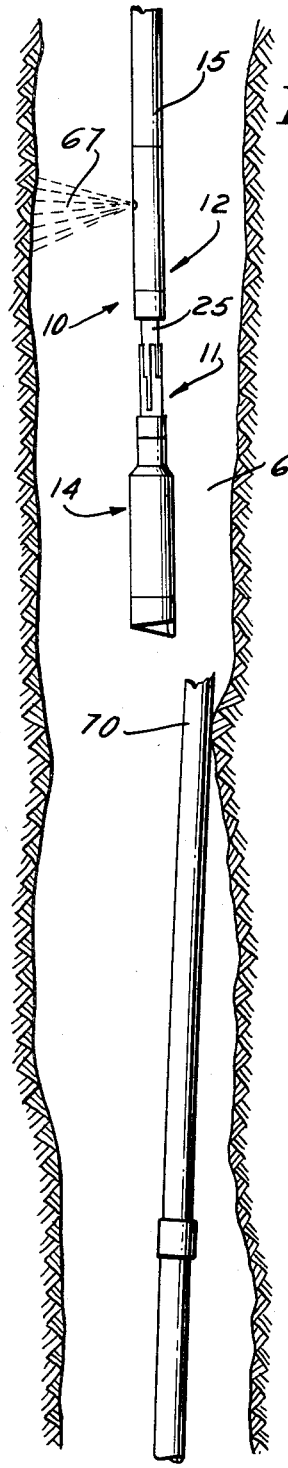
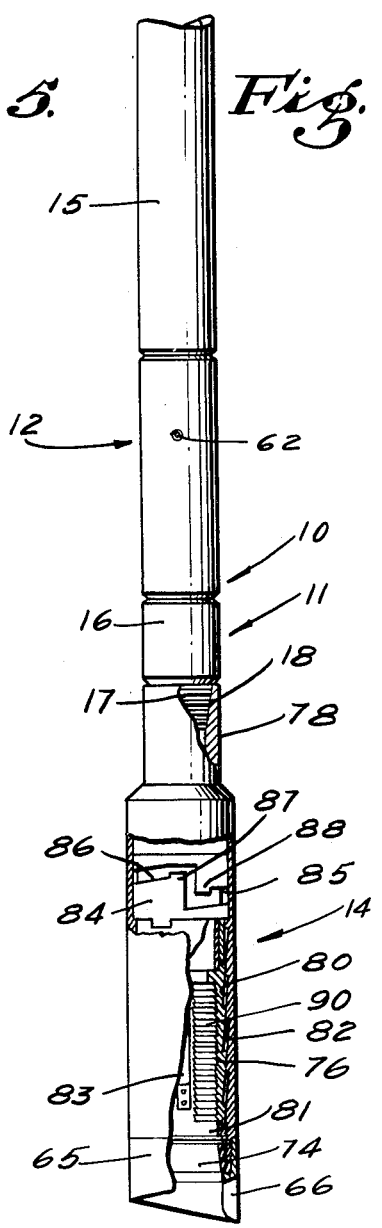

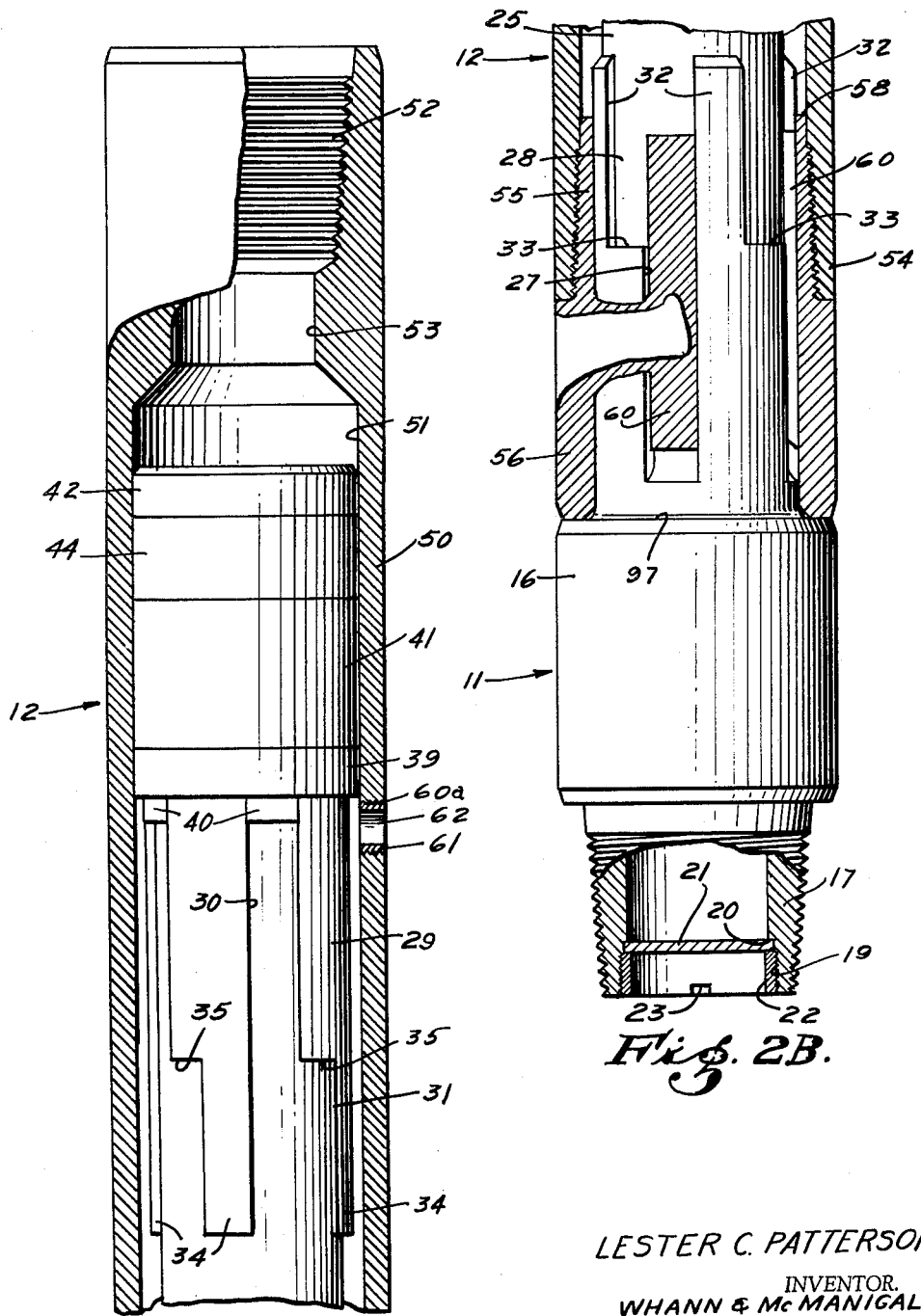

United States Patent Office 3,020,081
Patented Feb. 6, 1962

3,020,081
HYDRAULIC KICK BUMPER SUB
Lester C. Patterson, 201 A St., Taft, Calif.
Filed Apr. 28, 1958, Ser. No. 731,466
13 Claims. (Cl. 294—86)

This invention relates generally to well drilling equipment or apparatus and relates more particularly to fishing tools and the like.

While the invention has particular utility in connection with oil well drilling equipment, and is herein shown and described in such connection, it is to be understood that its utility is not confined thereto.

In oil well drilling operations equipment may be broken or lost in a well, such equipment being, for example, drill pipe, tool joints, drill collars, liners, tubing, or any other type of fish.

While various types of equipment or devices have been used to recover such fish various difficulties and/or problems are encountered therewith. As is well known, a well being drilled or bored does not have perfectly straight side walls and a drill pipe or the like may become broken and the upper end lean against the wall in such a position as to be extremely difficult to engage with fishing tools. Not only must the fishing tool engage the fish but there should be a pack off to insure circulating while lifting, pulling, or jarring operations are carried on to recover the fish.

It is, therefore, an object of the present invention to provide a fishing tool or device that will overcome the difficulties and problems referred to above.

Another object of the invention is to provide a fishing tool or piece of equipment that will swing outwardly into engagement with the well wall so as to facilitate the picking up of the adjacent end of the fish.

Still another object of the invention is to provide a tool or piece of equipment of this character having means to utilize the pressure of drilling fluid to urge the fishing tool laterally toward or against the wall of the well while the drill string with the fishing tool attached, is rotated to pick up the fish.

A further object of the invention is to provide in apparatus of this character means for cutting off the discharge of drilling fluid which effects such lateral urging of the tool.

A still further object of the invention is to provide apparatus of this character wherein circulation of drilling fluid is established with the fish after the fishing tool engages said fish.

Another object of the invention is to provide apparatus of this character combining the fishing function with a bumper sub.

Another object of the invention is to provide apparatus of this character that is simple and sturdy in construction, and effective and reliable in operation.

Still another object of the invention is to provide apparatus of this character that is relatively inexpensive to manufacture.

The characteristics and advantages of the invention are further sufficiently referred to in connection with the following detailed description of the accompanying drawings which represent one embodiment. After considering this example, skilled persons will understand that variations may be made without departing from the principles disclosed, and I contemplate the employment of any structures, arrangements or modes of operation that are properly within the scope of the appended claims.

Referring to the drawings:

FIG. 1 is a side view of apparatus embodying the present invention, said apparatus being in the telescoped or closed position;

FIG. 2A is a longitudinal section of the upper portion of the device in the telescoped or closed position;

FIG. 2B is a longitudinal section of the lower portion of said device in said telescoped or closed position;

FIG. 3A is a longitudinal section of the upper portion of the device in the extended open position;

FIG. 3B is a view of the lower portion of the device in the extended or open position;

FIG. 4 is a side view of a circulation establishing tool; and

FIG. 5 is a diagrammatic view of a portion of an oil well with a fish therein and apparatus embodying the present invention in a fishing position.

Referring first to FIGS. 1 and 5, there is disclosed a bumper sub, indicated generally at 10, embodying the present invention. The bumper sub comprises a mandrel assembly 11 and a barrel assembly 12. The mandrel assembly is connected to a suitable fishing tool, here shown as a rotary releasing socket 14 and it is to be understood, of course, that other types of fishing tools may be used in connection with the bumper sub 10. The barrel assembly 12 is connected to the lower pipe 15 of a drill string or the like.

The mandrel assembly 11 includes a tubular body 16 which is provided at its lower end with a tapered, externally threaded pin 17 which is adapted to be threadably received within the usual internally threaded box 18 of the rotary releasing socket 14. The pin 17 is provided with an enlarged internally threaded portion 19 having a shoulder 20 at the inner or upper end against which is received a peripheral portion of a shatterable plate 21 of any suitable material such as, for example, cast iron or plastic. Plate 21 is secured on the shoulder 20 by means of an externally threaded tubular nut 22 having peripheral notches 23 adapted to be engaged by a suitable tool for turning same into said part 19 or out of same.

From the upper end of the tubular body 16 there extends a tubular shank 25 of substantially smaller diameter than the diameter of the body 16. Since the body 16 and shank 25 of the mandrel are tubular, the mandrel as a whole is, of course, tubular. At the lower end of the shank 25 is a part 26 of greater diameter than the shank but of less diameter than the body, the lower end of said part 26 joining the body 16 at the upper end thereof. Part 26 is provided with a plurality of annularly spaced slots 27 comprising a group of slots and said slots 27 extend longitudinally downward from the upper end of part 26. Each slot 27 is provided with an upper end portion 28 of greater circumferential width than the lower portion of the slot. The portion 28 of each slot extends laterally and, as shown in the drawings, extends to the left. Spaced upwardly of the part 26 is a part 29 of substantially the same diameter as the part 26 and part 29 is provided with a plurality of longitudinally extending slots 30 comprising a second group of slots and said slots 30 are open at both ends of the part 29. Each of the slots 30 is provided with a portion 31 at the lower end which is of greater circumferential width than the upper portion thereof. The portion 31 extends laterally to one side relative to the slots 30 and is open at the lower end, and as shown, extends to the right. Between the upper portions of the slots 27 are longitudinally extending fingers 32 which are aligned longitudinally with the upper narrower portions of the slots 30 and at the base of each of the fingers 32 is a shoulder 33 which extends toward the narrower portions of the respective slots 27. The part 29 has fingers 34 between the enlarged parts of the slots 30 and said fingers are aligned with the narrower lower portions of the respective slots 27. At the upper ends of the fingers 34 are shoulders 35 which extend toward the narrower portions of the respective slots 30.

An upper end portion 38 of the shank extends upwardly of the part 29 thereof, and a lock ring 39 is disposed on said upper end portion 38. The lock ring 39 rests on the upper end of the part 29 and is provided with a plurality of depending lugs 40 which are received in the upper ends of the respective slots 30 so that the ring 39 is held against rotation on the shank. Above the ring 39 the shank portion 38 is externally threaded for reception of an internally threaded nut 41 which is screwed down onto the ring 39 and holds same against upward movement. A packing nut 42 is also screwed onto the portion 38 of the shank above the nut 41 and is provided with a reduced diameter depending sleeve 43 on which is disposed a rubber seal 44. The nut 42 is screwed tightly against the nut 41 and is locked against rotation on the shank by means of Allen screws 45 or the like. Parts 26 and 29 are integral with the shank.

The barrel assembly 12 comprises a tubular barrel 50 having a cylindrical interior chamber 51 in which the mandrel shank and parts thereon are received when the device is telescoped. At the upper end of the barrel 50 there is the usual flared box or socket 52 which is internally threaded for reception of the externally threaded pin of an adjacent part of the drill string, such as the pipe 15, FIG. 5. The socket 52 is connected with the interior 51 of the barrel by means of an axial bore 53. At the lower end said barrel is provided with a slightly flaring internally threaded end portion 54 for threadable reception of the externally threaded upper or inner end portion 55 of a drive sleeve 56 which has the same external diameter as that of the barrel 50. At the upper end of the portion 55, there is an annular end part 57 which has a shoulder 58 at its free end against which the adjacent end of the lock ring 39 is adapted to abut so as to limit extension of the mandrel assembly and the barrel assembly. Within the drive sleeve 56 are a plurality of annularly spaced longitudinally extending splines 60 of such width as to be readily received in the narrow portions of the slots 27 and 30. The length of the splines is a little less than the distance between a shoulder 33 of the slots 27 and the adjacent end of a finger 34.

Barrel 50 is provided with a tapped opening 60a therethrough in which is disposed an orifice plug 61 which is externally threaded and screwed into the opening 60a, the ends of said plug 61 being substantially flush with the interior and exterior surfaces of said barrel, said plug 61 having a discharge or jet orifice 62 through which drilling fluid is discharged under conditions to be described hereinafter.

When it is desired to use the device for fishing, said device is extended, the orifice 62 then being above the sealing element 44, as best shown in FIG. 3A. When the mandrel and barrel assemblies are in such an extended position, the splines 60 are disposed in the upper narrower portions of the slots 30 and rotation of the barrel in the usual manner and direction will cause rotation of the mandrel and the fishing tool 14 or the like connected to the lower end of said mandrel. As the drilling string is rotated and effects rotation of the barrel and mandrel assemblies, and the fishing tool, drilling fluid is pumped down through the drill string. This fluid is prevented from flowing downwardly beyond the plate 21 in the lower end of the mandrel so that a discharge of said fluid is effected through the jet opening 62. This discharged fluid is under substantial pressure which is sufficient to cause the device to be forced in the direction opposite the direction of discharge through said opening 62.

The rotary releasing socket 14 is of well-known type and construction and includes a guide shoe 65 having a lip 66. When the device 10 is in the extended position, the discharge jet 62 is diametrically opposite said lip 66.

When fishing operations are in progress, the drill string is rotated slowly so as to rotate the device 10 and the releasing socket 14 and at the same time the drilling fluid is discharged, as indicated at 67, to force the releasing socket 14 laterally. In FIG. 5, there is shown a well bore 68, the wall 69 of which is irregular. The upper end 70 of a fish is shown leaning against the wall 69 as often happens. The device 10 and releasing socket 14 are shown in the normal substantially vertical position but as the drill string is rotated and the fluid 67 discharged, the device 10 and releasing socket 14 are forced outwardly and into engagement with the side wall 69 of the well. Rotation of the drill string is continued and said string is gradually lowered until the guide shoe engages the upper end of the fish 70 which enters said shoe. With further lowering of the device, the upper end of the fish will pass up through the pack off rubber 74, FIG. 1, and into a position within the bowl 75 of the socket whereat the slips 76 are in a position to engage the upper end of the fish.

The rotary releasing socket 14 is manufactured by the Shaffer Tool Works and is well-known in the art. However, a brief description thereof will be given of the construction and operation thereof. The device includes a top sub 78 which has the socket 18 at its upper end, said top sub 78 being attached to the upper end of a tubular bowl 79 having a plurality of annular, interior, tapered steps 80. The guide shoe 65 is secured to the lower end of said bowl and the pack off rubber 74 is secured within said guide shoe. Operably disposed within the bowl is a cage 81 having a plurality of longitudinally extending openings in which are operably disposed the slips 76 which have a plurality of exterior steps 82 cooperable with the steps 80 of the bowl. Within the cage 81 are a plurality of bow springs 83.

In the upper end portion of the bowl 79 is a cam 84 which is welded or otherwise secured in the bowl. The upper end portion of the cage 81 is rotatable within said cam 84 and is provided at the upper end with a downwardly facing shoulder 85 having substantially the same configuration as the cam surface 86 of the cam 84. The cam 84 is provided with an upwardly extending lug 87 and at one end of the shoulder 85 there is a downwardly extending lug 88 adapted to ride on the cam surface 86, lug 87 riding on the shoulder 85.

While the device 10 is still in the extended position, the string, including the device 10 and releasing socket 14, is rotated to the left one or more turns. The bow springs 83 frictionally engage the end of the fish within said socket 14 and hold the cage against rotation as the bowl 79 rotates. The cam arrangement above described, effects lowering of the cage so that the wickers 90 of the slips 76 engage the fish. A pull sets the slips on the steps 80 of the bowl and on the fish so as to securely grip said fish.

The device 10 is then telescoped, this being effected by lowering of the string still further so that the barrel assembly 12 will telescope on the mandrel shank until the lower ends of the splines 60 of said barrel assembly engage the upper ends of the fingers 32 of the mandrel assembly.

As the barrel unit is rotated to move the splines toward the right, as shown in the drawing, the upper end portions of said splines will enter the widened part 31 of the upper slots 30 and when said splines engage the adjacent right hand side wall of said enlarged slot portions 31, said splines will be in alignment with the upper, enlarged parts 28 of the slots 27 so that as the barrel assembly is lowered further, the lower ends of said splines will engage the shoulders 33 of the slots 27. Continued rotation of the string and barrel assembly in the above described direction will cause the lower end portions of said splines to engage the walls defining the right hand sides of said slots 27 so that said splines may be lowered further into the bottom portions of the slots 27. The device 10 is then fully telescoped and the seal 44 is disposed above the jet opening 62 as best shown in FIG. 2A.

The next step is the establishment of circulation of the drilling fluid through the fish and this is effected by applying sufficient fluid pressure in the string and device 10 to break the plate 21 so that the drilling fluid may be pumped on down into and through said fish.

There may be conditions such that the drilling fluid pressure developed by the pump is insufficient to fracture or shatter the plate 21. In such case, it is necessary to use other means to break the plate. Various devices may be used, one such device being shown in FIG. 4 and comprises an elongated bar 92 having an inverted frusto-conical tip 93 at the lower end and having an eye 94 for attachment of a cable 95 or the like. The bar 92 is lowered through the string by means of the cable and the lower end 93 of said bar is adapted to strike said plate over a relatively small area and effect shattering of said plate. The bar 92 is then raised to the top of the drill string and removed therefrom by means of the cable 95.

When it is desired to use the device 10 as a bumper sub for striking a downward blow, the barrel assembly is raised and lowered in the usual manner so that the lower ends of the drive sleeve 56 strike the annular external shoulder 97 at the upper end of the body 16 of the mandrel. It will be understood, of course, that the splines 60 permit a limited upward and downward movement of the device 10 for effecting such downward blows, the splines being movable from the lowermost position within the lower parts of the lower slots 27 to a position whereat the upper ends of said splines strike the lower ends of the fingers 34. Also, it will be apparent that rotation of the barrel assembly will effect corresponding rotation of the mandrel, the drive between the barrel unit and mandrel being effected through said splines and the walls of the slots engageable by said splines.

When it is desired to use the device 10 as a bumper sub for striking an upward blow, the barrel assembly is raised to the extended position, shown in FIGS. 3A, 3B and 5, by reversing the procedure described in connection with the telescoping of the device. When said device is in this extended position, the barrel unit may be raised and lowered a limited amount so as to cause the upper end part 57 of the drive sleeve 56 to strike upwardly against the ring 39. The splines 60 permit such limited movement and said splines travel between an upper position whereat the upper ends thereof engage the lower ends of the lugs 40 of the ring 39 and a position whereat the lower ends of said splines engage the upper ends of the fingers 32 of the slots 27. When the device 10 is being used as a bumper sub for striking either a downward or an upward blow, the usual procedure in such cases is followed.

While a rotary releasing socket is shown in connection with the kick bumper sub 10, it is to be understood that other types of fishing tools may be used. For example, rotary releasing spears may be used as well as other types of fishing devices.

It is thought that the invention and many of its attendant advantages will be understood from the foregoing description and it is thought that it will be apparent that various changes may be made in the form, construction and arrangement of the parts of the invention without departing from the spirit and scope thereof or sacrificing all of its material advantages, the embodiment hereinbefore described being merely for the purposes of illustration.

I claim:

1. A hydraulic kick bumper sub, comprising: a mandrel assembly including a tubular mandrel having a bore therethrough and having a body from one end of which there extends an axially arranged externally threaded, tapered pin having an internally threaded counterbore with a shoulder at the inner end thereof; a shatterable plate in said counterbore and in abutment with said shoulder; an externally threaded nut threaded into said counterbore and securing said plate against said shoulder; a shank of reduced diameter extending axially from the opposite end of said body, said shank having a first enlarged diameter part adjacent said body and of smaller diameter than said body, said part having a plurality of annularly spaced slots extending from the free end of said part toward said body, the slots being of greater annular width at the top than at the bottom with a shoulder at the inner end of each of said wider portions, there being a longitudinally extending finger between each of the larger portions of said slots, said fingers terminating at the outer end of said first part; a second enlarged diameter part on said shank of substantially the same diameter as the first enlarged diameter part and spaced longitudinally outwardly of the first part, said second part having a plurality of annularly spaced slots which are of greater annular width at the end of said second part facing the first part, the fingers of one part being aligned with the narrower portions of the slot of the other part, said mandrel having a shank end extending outwardly beyond the second part; a lock ring secured on said end part, said ring having lugs receivable in the adjacent end portions of the slots of the second part of the mandrel; an annular sealing element on said end part of the shank; means securing said sealing element secured on said end part of the shank; a barrel assembly including a tubular barrel in which the shank portion of the mandrel is telescopically receivable with the sealing element in slidable sealing engagement with the interior of said barrel, said barrel having an internally threaded socket at its outer end for attachment to an adjacent part of a drill string; a drive sleeve threadably secured to the inner end of said barrel, said drive sleeve including an annular striking inner end part and a plurality of annularly arranged internal splines of a width to be received in the narrower portions of the slots of the first and second part of the mandrel shank; telescoping and extension of the mandrel and barrel assemblies being effected by relative longitudinal and rotational movements thereof, said bumper sub being effective for downward blows when the assemblies are in telescoped position and upward blows when in the extended positions, there being a discharge jet opening in the wall of the barrel so positioned that when the assemblies are in the extended position, said jet opening is positioned outwardly of the sealing element in the barrel and when the assemblies are in the telescoped position, said jet opening is positioned inwardly of said sealing element; and means operable on said plate for breaking same.

2. A hydraulic kick bumper sub, comprising: a mandrel assembly including a tubular mandrel having a bore therethrough and having a body from one end of which there extends an axially arranged externally threaded, tapered pin having an internally threaded counterbore with a shoulder at the inner end thereof; a shatterable plate in said counterbore; an externally threaded nut threaded into said counterbore and securing said plate against said shoulder; a shank of reduced diameter extending axially from the opposite end of said body, said shank having a first enlarged diameter part adjacent said body and of smaller diameter than said body, said part having a plurality of annularly spaced slots extending from the free end of said part toward said body, the slots being of greater width at the top than at the bottom with a shoulder at the inner end of each of said wider portions, there being a longitudinally extending finger between each of the larger portions of said slots; a second enlarged diameter part on said shank of substantially the same diameter as the first enlarged diameter part and spaced longitudinally outwardly of the first part, said second part having a plurality of annularly spaced slots which are of greater annular width at the end of said second part facing the first part, the fingers of one part being aligned with the narrower portions of the slot of the other part, said mandrel having a shank end extending outwardly beyond the second part; a lock ring secured on said end part; an annular sealing element secured on said end part of the shank; a barrel assembly including a tubular barrel in which the shank portion of the mandrel is telescopically receivable with the sealing element in slidable sealing engagement with the interior of said barrel, a drive sleeve secured to the inner end of said barrel, said drive sleeve including an annular striking inner end part and a plurality of annularly arranged internal splines of a width to be received in the narrower portions of the slots of the first and second part of the mandrel shank; telescoping and extension of the mandrel and barrel assemblies being effected by relative longitudinal and rotational movements thereof, said bumper sub being effective for downward blows when the assemblies are in telescoped position and upward blows when in the extended positions, there being a discharge jet opening in the wall of the barrel so positioned that when the assemblies are in the extended position, said jet opening is positioned outwardly of the sealing element in the barrel and when the assemblies are in the telescoped position, said jet opening is positioned inwardly of said sealing element; and means operable within said mandrel for breaking said plate.

3. In a hydraulic kick bumper sub: a mandrel assembly including a tubular mandrel having a bore therethrough and having a body part and a shank of reduced diameter extending axially from one end of said body, said shank having a first enlarged diameter part adjacent said body and of smaller diameter than said body, said part having a plurality of annularly spaced slots extending from the free end of said part toward said body, the slots being of greater width at the top than at the bottom with a shoulder at the inner end of each of said wider portions, there being a longitudinally extending finger between each of the larger portions of said slots; a second enlarged diameter part on said shank of substantially the same diameter as the first enlarged diameter part and spaced longitudinally outwardly of the first part, said second part having a plurality of annularly spaced slots which are of greater annular width at the end of said second part facing the first part, the fingers of one part being aligned with the narrower portions of the slot of the other part, said mandrel having a shank end extending outwardly beyond the second part; a lock ring secured on said end part; an annular sealing element secured on said end part of the shank; a shatterable plate secured in said mandrel and closing the bore therethrough; a barrel assembly including a tubular barrel in which the shank portion of the mandrel is telescopically receivable with the sealing element in slidable sealing engagement with the interior of said barrel; an annular striking shoulder within said barrel assembly adapted to strike said ring and a plurality of annularly arranged splines on the interior of said barrel assembly, said splines being slidably receivable in the narrower portions of the slots of the first and second part of the mandrel shank; telescoping and extension of the mandrel and barrel assemblies being effected by relative longitudinal and rotational movements thereof, said bumper sub being effective for downward blows when the assemblies are in telescoped position and upward blows when in the extended positions, there being a discharge jet opening in the wall of the barrel so positioned that when the assemblies are in the extended position, said jet opening is positioned outwardly of the sealing element in the barrel and when the assemblies are in the telescoped position, said jet opening is positioned inwardly of said sealing element; and means operable within the bumper sub for breaking said plate.

4. In a hydraulic kick bumper sub: a mandrel assembly including a tubular mandrel having a bore therethrough, said mandrel including a shank having a group of annularly spaced slots adjacent one end and a second group of annularly spaced slots spaced longitudinally outwardly of the first group of slots, the ends of each group of slots facing the other group being open and the slots of one group being staggered relative to respective slots of the other group; an annular sealing element secured on said shank outwardly of the second group of slots; a barrel assembly including a tubular barrel in which at least a part of the shank of the mandrel is telescopically receivable, with the sealing element in slidable sealing engagement with the interior of said barrel; a plurality of annularly arranged splines on the inside of the barrel assembly, said splines being receivable in respective groups of slots; telescoping and extension of the mandrel and barrel assemblies being effected by relative longitudinal and rotational movements thereof; striking parts on said assemblies, said assemblies having limited longitudinal movement relative to each other when in the telescoped and in the extended positions respectively, said striking parts being arranged so that upward and downward blows may be provided therebetween when said assemblies are extended or telescoped respectively, there being a discharge jet opening in the wall of the barrel so positioned that when the assemblies are in the extended position, said jet opening is positioned outwardly of the sealing element in the barrel, and when the assemblies are in the telescoped position, said jet opening is at the inner side of said sealing element; a shatterable plate closing the bore of the mandrel; and means operable within the bumper sub for breaking said plate.

5. In combination: a hydraulic kick bumper sub comprising, a mandrel assembly including a tubular mandrel having a bore therethrough, said mandrel including a shank having a group of annularly spaced spline slots adjacent one end, and a second group of annularly spaced slots spaced longitudinally outwardly of the first group of slots, the ends of each group of slots facing the other group being open and the slots of one group being staggered relative to respective slots of the other group; an annular sealing element secured on said shank outwardly of the second group of slots; a barrel assembly including a tubular barrel in which at least a part of the shank of the mandrel is telescopically receivable, with the sealing element in slidable sealing engagement with the interior of said barrel; a plurality of annularly arranged splines on the inside of the barrel assembly, said splines being receivable in said slots; telescoping and extension of the mandrel and barrel assemblies being effected by relative longitudinal and rotational movements thereof; striking parts on said assemblies, said assemblies having limited longitudinal movement relative to each other when in the telescoped and in the extended positions respectively, said striking parts being arranged so that upward and downward blows may be provided therebetween when said assemblies are extended or telescoped respectively, there being a discharge jet opening in the wall of the barrel so positioned that when the assemblies are in the extended position, said jet opening is positioned outwardly of the sealing element in the barrel, and when the assemblies are in the telescoped position, said jet opening is at the inner side of said sealing element; a shatterable plate closing the mandrel bore; means operable within the bumper sub for breaking said plate; and a socket type fishing tool having an open lower end with a lip at said end, and an internal annular seal, said jet opening being located at the diametrically opposite side of the barrel relative to the lip of said socket.

6. In a hydraulic kick bumper sub: a tubular mandrel assembly including a shank and an annular sealing element adjacent the inner free end of said shank; a barrel assembly including a tubular barrel in which at least a part of the shank of the mandrel is telescopically receivable with the sealing element in slidable sealing engagement with the interior of said barrel; said assemblies being movable longitudinally between fully telescoped and fully extended positions; means providing a rotary drive connection between said assemblies when in said positions respectively; means limiting relative longitudinal movement between said assemblies when at said positions; striking parts on said assemblies, said striking parts being arranged so that upward and downward blows may be provided therebetween when said assemblies are extended or telescoped respectively, there being a discharge jet opening in the wall of the barrel so positioned that when the assemblies are in the extended position, said jet opening is positioned outwardly of the sealing element in the barrel and when the assemblies are in the telescoped position, said jet opening is at the inner side of said sealing element; and means operable on said plate for breaking same.

7. In combination: a hydraulic kick bumper sub comprising a tubular mandrel assembly including a shank, and an annular sealing element adjacent the inner free end of said shank; a barrel assembly including a tubular barrel in which at least a part of the shank of the mandrel is telescopically receivable with the sealing element in slidable sealing engagement with the interior of said barrel, said assemblies being movable longitudinally between fully telescoped and fully extended positions; means providing a rotary drive connection between said assemblies when in said positions; means limiting relative longitudinal movement between said assemblies when at said positions; striking parts on said assemblies, said striking parts being arranged so that upward and downward blows may be provided therebetween when said assemblies are extended or telescoped respectively; a shatterable plate preventing fluid flow through the mandrel; a socket type fishing tool secured to the lower end of the mandrel and having a fish engaging lip, there being a discharge jet in the opening in the wall of the barrel at the opposite side from said lip; and means operable on said plate for breaking same.

8. In combination: a hydraulic kick bumper sub comprising a tubular mandrel assembly including a shank, and an annular sealing element adjacent the inner free end of said shank; a barrel assembly including a tubular barrel in which at least a part of the shank of the mandrel is telescopically receivable with the sealing element in slidable sealing engagement with the interior of said barrel, said assemblies being movable longitudinally between fully telescoped and fully extended positions; means providing a rotary drive connection between said assemblies when in said positions; means limiting relative longitudinal movement between said assemblies when at said positions; striking parts on said assemblies, said striking parts being arranged so that upward and downward blows may be provided therebetween when said assemblies are extended or telescoped respectively; a shatterable plate preventing fluid flow through the mandrel; and a socket type fishing tool secured to the lower end of the mandrel and having a fish engaging lip, there being a discharge jet in the opening in the wall of the barrel at the opposite side from said lip.

9. In a hydraulic kick bumper sub through which drilling fluid may flow: a tubular mandrel assembly including a shank having a bore therethrough; an annular sealing element on said shank adjacent the free end thereof; a shatterable closure for the bore of said shank; a barrel assembly including a tubular barrel in which said shank is telescopically slidable with the sealing element in slidable sealing engagement with the interior of said barrel, said assemblies being movable longitudinally between telescoped and extended positions; means providing a rotary drive connection between said assemblies; and means for effecting upward and downward striking blows between said assemblies when same are in the extended and telescoped positions respectively, there being a discharge jet opening in the wall of the barrel so positioned that when the assemblies are in the extended position, said jet opening is positioned outwardly of the sealing element in the barrel connected with the interior of the barrel for receiving fluid therefrom, and when the assemblies are in the telescoped position, said jet opening is at the inner side of said sealing element and cut off said jet opening from receiving fluid from said barrel.

10. In a hydraulic kick bumper sub: a barrel assembly including a tubular barrel having a jet opening in one side thereof; a mandrel assembly, having a passage therethrough and including a part telescopically receivable in the barrel; a sealing element on said part in slidable sealing engagement with the interior of said barrel, said assemblies being movable longitudinally between telescoped and extended positions, the sealing element of said mandrel being at one side of the jet opening when the assemblies are extended and at the opposite side of said opening when the assemblies are telescoped; and a shatterable closure closing the passageway through the mandrel.

11. A combination of a bumper sub comprising a mandrel assembly and a barrel assembly telescopically connected together, said barrel assembly having a discharge jet at one side which is in operable communication with the interior of said bumper sub when the parts thereof are extended and which is operably closed against communication with the interior of the bumper sub when the parts thereof are telescoped; and a fishing tool secured to one end of one of said assemblies.

12. In a hydraulic kick bumper sub in which drilling fluid is received: a barrel assembly including a tubular barrel having a jet opening in one side thereof; a mandrel assembly, having a passage therethrough and including a part telescopically receivable in the barrel; and a sealing element on said part in slidable sealing engagement with the interior of said barrel, said assemblies being movable longitudinally between telescoped and extended positions, the sealing element of said mandrel being at one side of the jet opening when the assemblies are extended so that fluid from within the bumper sub may be discharged through said jet opening and at the opposite side of said opening when the assemblies are telescoped to thereby cut off said jet opening from fluid in said bumper sub.

13. In a hydraulic kick bumper sub in which drilling fluid is received: a tubular mandrel assembly including a shank having a bore therethrough; an annular sealing element on said shank adjacent the free end thereof; a barrel assembly including a tubular barrel in which said shank is telescopically slidable with the sealing element in slidable sealing engagement with the interior of said barrel, said assemblies being movable longitudinally between telescoped and extended positions; means providing a rotary drive connection between said assemblies; and means for effecting upward and downward striking blows between said assemblies when same are in the extended and telescoped positions respectively, there being a discharge jet opening in the wall of the barrel so positioned that when the assemblies are in the extended position, said jet opening is positioned outwardly of the sealing element in the barrel so that fluid within the bumper sub may be discharged through said jet opening and when the assemblies are in the telescoped position, said jet opening is at the inner side of said sealing element to thereby cut off said jet opening from fluid in said bumper sub.

References Cited in the file of this patent

UNITED STATES PATENTS

| 1,405,025 | Sorensen | Jan. 31, 1922 |
| 1,696,378 | Brauer | Dec. 25, 1928 |
| 1,860,016 | Clouse | May 24, 1932 |
| 1,870,540 | Wells | Aug. 9, 1932 |
| 2,394,832 | Young | Feb. 12, 1946 |
| 2,502,567 | Howard | Apr. 4, 1950 |
| 2,647,008 | Stewart et al. | July 28, 1953 |